(12) United States Patent
Mori (10) Patent No.: US 10,518,586 B2
(45) Date of Patent: Dec. 31, 2019

(54) PNEUMATIC TIRE

(71) Applicant: BRIDGESTONE CORPORATION, Chuo-ku, Tokyo (JP)

(72) Inventor: Yosuke Mori, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 16 days.

(21) Appl. No.: 15/305,100

(22) PCT Filed: Apr. 15, 2015

(86) PCT No.: PCT/JP2015/061598
§ 371 (c)(1),
(2) Date: Oct. 19, 2016

(87) PCT Pub. No.: WO2015/163215
PCT Pub. Date: Oct. 29, 2015

(65) Prior Publication Data
US 2017/0036485 A1 Feb. 9, 2017

(30) Foreign Application Priority Data
Apr. 25, 2014 (JP) ................................. 2014-091696

(51) Int. Cl.
*B60C 9/18* (2006.01)
*B60C 9/22* (2006.01)
(Continued)

(52) U.S. Cl.
CPC .............. *B60C 9/20* (2013.01); *B60C 9/2006* (2013.01); *B60C 9/28* (2013.01); *B60C 9/30* (2013.01);
(Continued)

(58) Field of Classification Search
CPC .... B60C 9/18; B60C 9/20; B60C 9/22; B60C 9/28; B60C 2009/2219; B60C 2009/2038
See application file for complete search history.

(56) References Cited

U.S. PATENT DOCUMENTS 3,735,791 A * 5/1973 McKissick ................ B60C 3/04
152/454
5,435,369 A 7/1995 Yap et al.
(Continued)

FOREIGN PATENT DOCUMENTS

CN 1080895 A 1/1994
CN 1578737 A 2/2005
(Continued)

OTHER PUBLICATIONS

Machine translation of JP 0628647, 1994.*
(Continued)

*Primary Examiner* — Justin R Fischer
(74) *Attorney, Agent, or Firm* — Solaris Intellectual Property Group, PLLC (57) ABSTRACT

A pneumatic tire includes a carcass, a tread portion and a belt layer having a first inclined belt ply, circumferential direction belt ply, and second inclined belt ply. Ground contact edge side belt plies extend from tire width direction end portions of the second inclined belt ply toward tire width direction outsides, at a tire radial direction outside of the carcass. With respect to a tire circumferential direction, an angle of cords of the first inclined belt ply is from 45° to 60°, an angle of a cord of the circumferential direction belt ply is 5° or less, an angle of cords of the second inclined belt ply is from 30° to 60°, and an angle of cords of the ground contact edge side belt plies exceeds 5° and is 30° or less. A distance dimension of the ground contact edge side belt plies is 80% or more of a ground contact width.

5 Claims, 2 Drawing Sheets

(51) Int. Cl.
*B60C 9/28* (2006.01)
*B60C 9/20* (2006.01)
*B60C 9/30* (2006.01)

(52) U.S. Cl.
CPC ............. *B60C 2009/2019* (2013.01); *B60C 2009/2038* (2013.01); *B60C 2009/2093* (2013.01); *B60C 2009/2096* (2013.01); *B60C 2009/2219* (2013.01)

(56) References Cited

U.S. PATENT DOCUMENTS

| | | | |
|---|---|---|---|
| 2004/0200557 A1 | 10/2004 | Jardine et al. | |
| 2006/0225824 A1* | 10/2006 | Kuwajima | B60C 9/22 152/527 |
| 2013/0042954 A1* | 2/2013 | Becker | B60C 9/006 152/535 |
| 2013/0206310 A1 | 8/2013 | Yoshikawa | |
| 2017/0087939 A1 | 3/2017 | Lacko et al. | |

FOREIGN PATENT DOCUMENTS

| | | | |
|---|---|---|---|
| EP | 471088 | * | 2/1992 |
| JP | 6-286417 | * | 11/1994 |
| JP | 2008-87710 | * | 4/2008 |
| JP | 2008-132818 A | | 6/2008 |
| JP | 2009-073246 A | | 4/2009 |
| JP | 2011-162023 A | | 8/2011 |
| JP | 2012-071665 A | | 4/2012 |
| JP | 2013-216113 A | | 10/2013 |
| WO | 2012/042873 A1 | | 4/2012 |

OTHER PUBLICATIONS

Search Report of the Chinese Office Action dated Jun. 19, 2017.
Extended European Search Report dated Apr. 7, 2017, from the EPO in an European patent application corresponding to the instant patent application.

* cited by examiner

PNEUMATIC TIRE

TECHNICAL FIELD

The present invention relates to a pneumatic tire that suppresses uneven wear.

BACKGROUND ART

A pneumatic tire described in Japanese Patent Application Laid-Open (JP-A) No. 2011-162023, for example, is known as a pneumatic tire employed in trucks, buses, and the like.

SUMMARY OF INVENTION

Technical Problem

Measures are being taken in such pneumatic tires to suppress uneven wear from occurring at shoulder sides of a tread portion; however, decreasing the aspect ratio tends to worsen uneven wear, such that there is a demand for technology that further suppresses uneven wear.

An object of an embodiment of the present invention is to provide a pneumatic tire capable of suppressing worsening of uneven wear at shoulder sides of a tread portion accompanying a decrease in the aspect ratio.

Solution to Problem

A pneumatic tire according to a first aspect includes a carcass that spans from one bead portion to another bead portion, a tread portion that is disposed at a tire radial direction outer side of the carcass inside the tread portion and that contacts a road surface, and a belt layer. The belt layer includes a first inclined belt ply that is disposed at the tire radial direction outer side of the carcass and that includes plural cords set at an angle of from 45° to 60° with respect to a tire circumferential direction, a circumferential direction belt ply that is disposed at the tire radial direction outer side of the first inclined belt ply, that includes a cord wound in a spiral shape and set at an angle of 5° or less with respect to the tire circumferential direction, and that is formed with a narrower width than the first inclined belt ply, a second inclined belt ply that is disposed at the tire radial direction outer side of the circumferential direction belt ply, that is inclined in an opposite direction to an inclination of the cords of the first inclined belt ply with respect to the tire circumferential direction, that includes plural cords set at an angle of from 30° to 60° with respect to the tire circumferential direction, and that is set with a width wider than that of the circumferential direction belt ply, and a pair of ground contact edge side belt plies that extend from at least both tire width direction end portions of the second inclined belt ply toward tire width direction outer sides, that extend further toward the tire width direction outer sides than an 80% position of a ground contact width of the tread portion, and that include plural cords set at an angle of less than 30° with respect to the tire circumferential direction.

In the pneumatic tire according to the first aspect, the circumferential direction belt ply is configured including the cord that is inclined at 5° or less with respect to the tire circumferential direction, thereby enabling rigidity of the belt layer with respect to out-of-plane bending in the tire circumferential direction to be raised, and out-of-plane bending deformation of the tread portion to be suppressed. Thus, an increase in compression distortion in the circumferential direction of a tire radial direction outer side portion of the belt layer can be suppressed, and elongation of the tire radial direction outer side portion of the belt layer at a kick-off side of the tread portion is also suppressed. This enables drag of the tread portion against the road surface to be suppressed, and suppresses a worsening of uneven wear at shoulder sides of the tread portion accompanying a decrease in aspect ratio.

When load in a direction intersecting the surface of the belt acts on the belt layer, for example, the deformed belt layer is no longer in its original plane. In the first aspect, this deformation is referred to as out-of-plane bending deformation, and resistance force to bending such that out-of-plane bending deformation is less liable to occur is referred to as rigidity with respect to out-of-plane bending.

The second inclined belt ply, which is inclined in the opposite direction to the inclination of the cords of the first inclined belt ply with respect to the tire circumferential direction, includes the cords set to an angle within a range of from 30° to 60° with respect to the tire circumferential direction, and is set with a width wider than that of the circumferential direction belt ply, is disposed at the tire radial direction outer side of the circumferential direction belt ply. The ground contact edge side belt plies, which include cords set at an angle that exceeds 5° and is less than 30° with respect to the tire circumferential direction, and are set with a width wider than that of the second inclined belt ply, are disposed at the tire radial direction outer side of the second inclined belt ply. The first inclined belt ply and the second inclined belt ply form an intercrossing belt layer, thereby improving the rigidity with respect to in-plane shearing of the belt layer.

This enables a difference in diameter between a tire equatorial plane side and the shoulder sides to be reduced and enables uneven wear performance to be improved. This improvement in rigidity with respect to in-plane shearing of the belt layer enables cornering power to be improved, thereby enabling steering stability to be improved.

The second inclined belt ply is disposed at the radial direction outer side of the circumferential direction belt ply, and the cords of the second inclined belt ply are at angle of from 30° to 60° with respect to the tire circumferential direction. This enables the rigidity of the belt layer with respect to out-of-plane bending in the tire circumferential direction to be raised and out-of-plane bending deformation of the belt layer in the tire circumferential direction to be suppressed, compared to cases in which the second inclined belt ply is not provided. This enables an advantageous effect, in which an increase in circumferential direction compression distortion of the belt layer is suppressed and uneven wear at the shoulder sides of the tread portion is suppressed, to be increased.

The cords of the ground contact edge side belt plies are at a smaller angle with respect to the tire circumferential direction than the cords of the second inclined belt ply, and rigidity with respect to out-of-plane bending in the tire circumferential direction is relatively high. Thus, disposing the ground contact edge side belt plies with high rigidity at the tire width direction outer sides of the second inclined belt ply enables rigidity with respect to out-of-plane bending in the tire circumferential direction to be improved at both tire width direction sides of the belt layer, compared to cases in which the width of the second inclined belt ply is widened.

A distance dimension in the tire width direction between a tire width direction outer side end of the ground contact edge side belt ply on one side of a tire equatorial plane, and a tire width direction outer side end of the ground contact edge side belt ply on another side of the tire equatorial plane is set at 80% or more of the ground contact width of the tread portion. Thus, the width direction outer side ends of the ground contact edge side belt plies are close to ground contact edges of the tread portion, enabling an advantageous effect, in which rigidity with respect to out-of-plane bending in the tire circumferential direction is raised by the ground contact edge side belt plies, to be extended as far as the vicinity of the ground contact edges.

Note that, since the cords of the second inclined belt ply are set at an angle of 30° or greater with respect to the tire circumferential direction, the second inclined belt ply has lower rigidity with respect to out-of-plane bending in the tire circumferential direction than the circumferential direction belt ply. Moreover, since the cords of the ground contact edge side belt plies are set at an angle that exceeds 5° and is less than 30° with respect to the tire circumferential direction, the ground contact edge side belt plies also have lower rigidity with respect to out-of-plane bending in the tire circumferential direction than the circumferential direction belt plies.

The reason that the width of the second inclined belt ply and the width of the ground contact edge side belt plies, with rigidity set in this manner, are set wider than the width of the circumferential direction belt ply, is because when the width of the second inclined belt ply and the width of the ground contact edge side belt plies, which are disposed at the tire radial direction outer side of the circumferential direction belt ply, are not set wider than the width of the circumferential direction belt ply, a step in rigidity with respect to out-of-plane bending in the tire circumferential direction increases at the tire width direction outer sides of the circumferential direction belt ply, and uneven wear performance is reduced at the tire width direction outer sides of the circumferential direction belt ply, namely, at the shoulder sides of the tread portion.

Thus, the width of the second inclined belt ply and the width of the ground contact edge side belt plies, which are set with a lower rigidity with respect to out-of-plane bending in the tire circumferential direction than the circumferential direction belt ply, are set wider than the width of the circumferential direction belt ply, and the second inclined belt ply and ground contact edge side belt plies are extended further toward the tire width direction outer sides than both width direction end portions of the circumferential direction belt ply, thereby enabling the rigidity to be gradually changed from tire width direction outer ends of the circumferential direction belt ply toward the ground contact edges of the tread portion.

The cord of the circumferential direction belt ply extends around the circumferential direction, thereby increasing a hoop effect, and enabling an increase in diameter when the internal pressure has been fully inflated and when rolling under load, to be suppressed. A large tensile force acts on the cord of the circumferential direction belt ply, such that damage to the cord due to input from the road surface, or from foreign matter piercing through the tread portion, is preferably suppressed. In the pneumatic tire according to the first aspect, the second inclined belt ply is disposed at the tire radial direction outer side of the circumferential direction belt ply, thereby enabling damage to the circumferential direction belt ply to be suppressed by the second inclined belt ply.

In the pneumatic tire according to the first aspect, the first inclined belt ply, which is configured including the plural cords set at an angle of from 45° to 60° with respect to the tire circumferential direction, is disposed as a first layer of the belt layer that is nearest to the carcass, thereby enabling plunger durability of the pneumatic tire to be secured. Note that setting the first inclined belt ply with a width wider than that of the circumferential direction belt ply enables a region in which plunger durability is secured to be extended in the tread width direction.

When the angle of the cords of the first inclined belt ply with respect to the tire circumferential direction is less than 45°, the rigidity of the first inclined belt ply in the tire circumferential direction is raised, the ability to envelop protruding objects is reduced, and there is a concern that plunger durability cannot be secured.

However, when the angle of the cords of the first inclined belt ply with respect to the tire circumferential direction exceeds 60°, the rigidity with respect to in-plane shearing is lowered, leading to a negative effect on uneven wear performance of the tread end portions, and a reduction in steering stability.

When the angle of the circumferential direction belt ply with respect to the tire circumferential direction exceeds 5°, the rigidity of the belt layer with respect to out-of-plane bending in the tire circumferential direction cannot be improved.

When the angle of the cords of the second inclined belt ply with respect to the tire circumferential direction is less than 30°, the rigidity with respect to in-plane shearing is lowered, leading to a negative effect on uneven wear performance of the tread end portions and a reduction in steering stability. However, when the angle of the cords of the second inclined belt ply with respect to the tire circumferential direction exceeds 60°, the rigidity with respect to in-plane shearing is lowered, leading to a negative effect on uneven wear performance of the tread end portions and a reduction in steering stability.

When the angle of the cords of the ground contact edge side belt plies is 30° or greater with respect to the tire circumferential direction, there is insufficient rigidity of the ground contact edge side belt plies with respect to out-of-plane bending in the tire circumferential direction, and the advantageous effect, in which rigidity with respect to out-of-plane bending in the tire circumferential direction is raised by the ground contact edge side belt plies, cannot be extended as far as the vicinity of the ground contact edges of the tread portion.

A pneumatic tire according to a second aspect is the pneumatic tire according to the first aspect, wherein the cords of the first inclined belt ply and the cords of the second inclined belt ply are inclined in opposite directions to each other with respect to the tire circumferential direction.

In the pneumatic tire according to the second aspect, the cords of the first inclined belt ply and the cords of the second inclined belt ply are inclined in opposite directions to each other with respect to the tire circumferential direction. Thus, the first inclined belt ply and the second inclined belt ply form an intercrossing belt layer, enabling rigidity of the belt layer with respect to in-plane shearing and rigidity of the belt layer with respect to out-of-plane bending in the tire circumferential direction to be further improved.

A pneumatic tire according to a third aspect is the pneumatic tire according to the first aspect or the second aspect, wherein the cord of the circumferential direction belt ply is an extendable cord that has elongation properties of from 4.5% to 5.5% elongation at break.

In the pneumatic tire according to the third aspect, since the cord of the circumferential direction belt ply is an extendable cord that has elongation properties of from 4.5% to 5.5% elongation at break, the cord is less liable to break, enabling durability of the ground contact edge side belt plies to be improved.

A pneumatic tire according to a fourth aspect is the pneumatic tire according to any one of the first aspect to the third aspect, wherein a part of each of the ground contact edge side belt plies contacts the second inclined belt ply, and the ground contact edge side belt plies are disposed in a region of from 60% to 105% of the ground contact width.

Disposing the ground contact edge side belt plies within a region of from 60% to 105% of the ground contact width enables the advantageous effect, in which rigidity of the tread portion with respect to out-of-plane bending in the tire circumferential direction is raised by the ground contact edge side belt plies, to be extended as far as the vicinity of the ground contact edges of the tread portion.

Since the ground contact edge side belt plies and the second inclined belt ply contact each other, there is no decrease in rigidity from the second inclined belt ply to the tire width direction outer side ends of the ground contact edge side belt plies.

Note that when the ground contact edge side belt plies are disposed further toward the outer sides (ground contact edge sides) than 105% of the ground contact width, manufacture is sometimes difficult.

However, when the ground contact edge side belt plies are disposed further toward the inside (tire equatorial plane side) than 60% of the ground contact width, placement is such that end portions overlap with the circumferential direction reinforcing belt and the inclined belts, reducing belt durability.

A pneumatic tire according to a fifth aspect is the pneumatic tire according to any one of the first aspect to the fourth aspect, wherein an aspect ratio is 65% or lower.

In the pneumatic tire according to the fifth aspect, the aspect ratio is 65% or lower, thereby enabling the tire cross-section height to be made even lower.

Advantageous Effects of Invention

As explained above, the pneumatic tire according to the first aspect has an excellent advantageous effect of enabling suppression of worsening uneven wear at the shoulder sides of the tread portion accompanying a decrease in the aspect ratio.

The pneumatic tire according to the second aspect enables a difference in diameter between the center side and the shoulder sides of the tread portion to be reduced and uneven wear at the shoulder sides of the tread portion to be further suppressed, and also enables steering stability.

The pneumatic tire according to the third aspect enables the durability of the circumferential direction belt ply to be improved.

The pneumatic tire according to the fourth aspect enables a malfunction accompanying a decrease in rigidity to be suppressed, since there is no portion formed that would lower the rigidity between the second inclined belt ply and the tire width direction outer side ends of the ground contact edge side belt plies.

The pneumatic tire according to the fifth aspect raises the advantageous effect of suppressing worsening of uneven wear at the shoulder sides of the tread portion accompanying a decrease in the aspect ratio.

DESCRIPTION OF EMBODIMENTS

First Exemplary Embodiment

Figure 1:
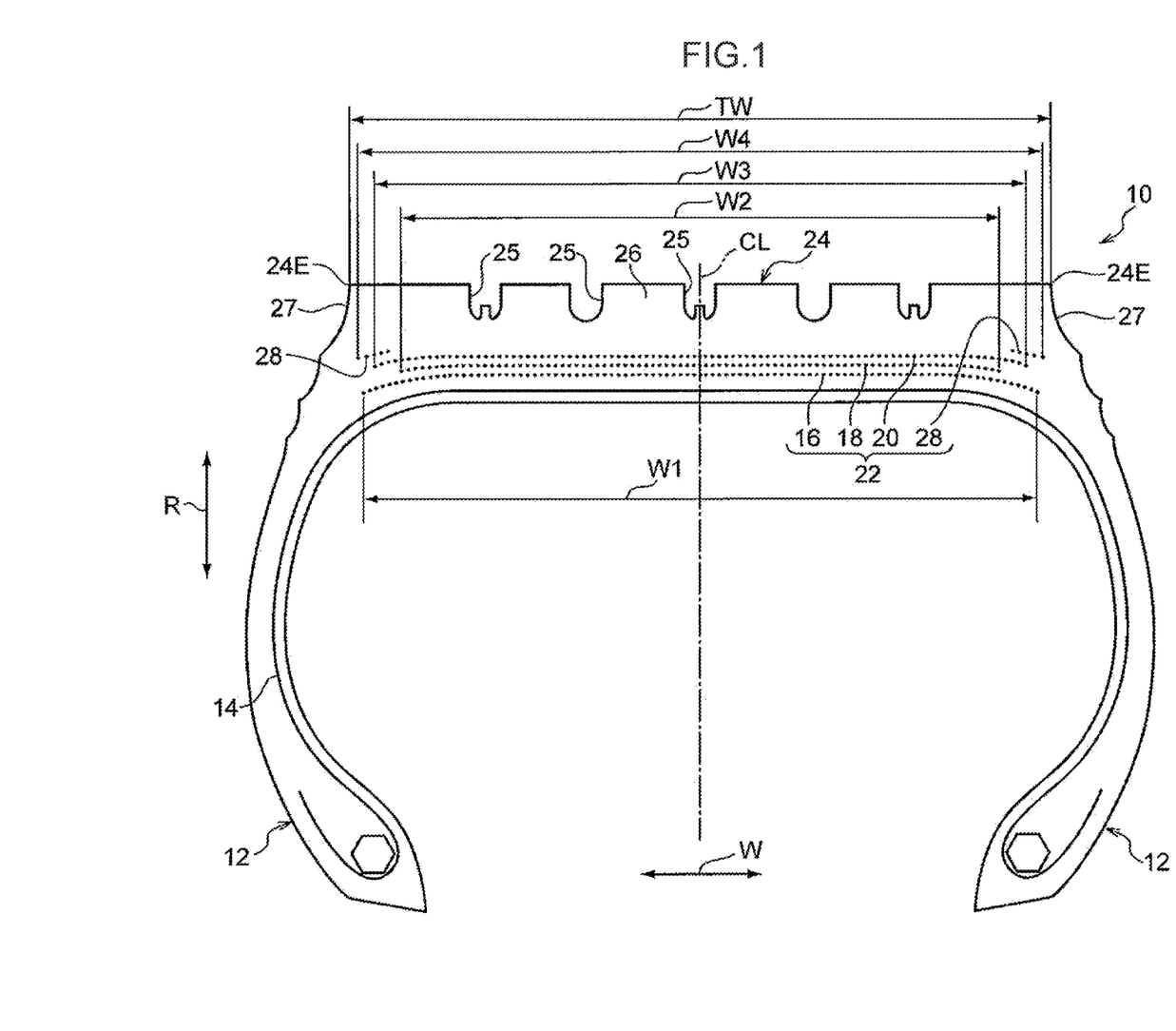
FIG. 1 is a cross-section taken along a tire rotation axis, illustrating a pneumatic tire according to a first exemplary embodiment.

Explanation follows regarding a pneumatic tire 10 according to a first exemplary embodiment of the present invention, with reference to FIG. 1. Note that in FIG. 1, the arrow W indicates a tire width direction, and the arrow R indicates a tire radial direction. As an example, the pneumatic tire 10 of the present exemplary embodiment is a truck or bus tire that has a tire size of 355/50R22.5 and is fitted to a rim with a rim diameter of 11.75 inches, and that is employed with an internal pressure of 900 kPa; however, application may be made to other sizes and other types of tires.

As illustrated in FIG. 1, the pneumatic tire 10 of the present exemplary embodiment includes a carcass 14 formed of one or more radial carcass plies that span between one bead portion 12 and another bead portion 12. In the carcass ply of the present exemplary embodiment, cord extends along a radial direction in a tire side view, and extends along a direction at right angles to a tire circumferential direction in a tread plan view.

A first inclined belt ply 16, a circumferential direction belt ply 18, and a second inclined belt ply 20 are disposed, in this sequence from the tire radial direction inside, at the tire radial direction outer side of the carcass 14. A pair of ground contact edge side belt plies 28 are disposed extending from both tire width direction end portions of the second inclined belt ply 20 toward the tire width direction outer sides. A belt layer 22 is configured by the first inclined belt ply 16, the circumferential direction belt ply 18, the second inclined belt ply 20, and the ground contact edge side belt plies 28.

A tread rubber layer 26, configuring a tread portion 24 that contacts a road surface, is disposed at the tire radial direction outer side of the belt layer 22. Note that water drainage grooves 25 are formed in the tread portion 24.

First Inclined Belt Ply

The first inclined belt ply 16 is formed of plural cords that are arrayed parallel to each other and covered in rubber. The cords of the first inclined belt ply 16 are inclined at an angle of 45° or greater with respect to the tire circumferential direction in order to secure plunger performance. Note that an upper limit of the angle of the cords of the first inclined belt ply 16 with respect to the tire circumferential direction is preferably 60°. Steel cords, organic fiber cords, or the like may be employed as the cords of the first inclined belt ply 16. As examples, nylon cords or aromatic polyamide cords may be applied as organic fiber cords.

A width W1 of the first inclined belt ply 16 is preferably set within a range of from 70% to 90% of a ground contact width TW of the tread portion 24.

Note that the ground contact width TW is the width of a portion of the tread portion that contacts the road surface (a distance from one ground contact edge to another ground contact edge of the tread portion) when the pneumatic tire 10 is fitted to a standard rim, as defined in the JATMA YEAR BOOK (Japan Automobile Tire Manufacturers Association standards), inflated to an internal pressure of 100% air pressure (maximum air pressure) corresponding to the maximum load capacity (load shown in bold in the internal pressure-load capacity correspondence table) for the applicable JATMA YEAR BOOK size/ply rating, disposed such that a rotation axis is parallel to a horizontal flat plate in a stationary state, and applied with a mass corresponding to the maximum load capacity. In cases in which TRA standards or ETRTO standards apply in the location of use or manufacturing location, then the respective standards are adhered to.

Circumferential Direction Belt Ply

The circumferential direction belt ply 18 is configured by winding one or plural rubber-covered cords in a spiral shape. An angle of the cord of the circumferential direction belt ply 18 with respect to the tire circumferential direction is set smaller than the angle of the cords of the first inclined belt ply 16 with respect to the tire circumferential direction, in order to obtain a hoop effect, and in order to suppress out-of-plane deformation of the belt layer 22 in the tire circumferential direction. Thus, the angle of the cords of the circumferential direction belt ply 18 is set at 5° or less with respect to the tire circumferential direction.

A width W2 of the circumferential direction belt ply 18 is set with a narrower width than the width W1 of the first inclined belt ply 16. The width W2 of the circumferential direction belt ply 18 is preferably set within a range of from 50% to 85% of the ground contact width TW. The width W2 of the circumferential direction belt ply 18 is also preferably set within a range of from 60% to 95% of the width W1 of the first inclined belt ply 16. (W1−W2)/2, namely, an actual dimension measured along a belt width direction from a tire width direction end of the first inclined belt ply 16 to a tire width direction end of the circumferential direction belt ply 18, is preferably 10 mm or greater.

An extendable cord (also referred to as a high elongation cord) is employed in the cord of the circumferential direction belt ply 18 in order to secure durability of the circumferential direction belt ply 18. Note that extendable cord referred to herein refers to cord that has a large total elongation at break, such as cord with elongation at break within a range of from 4.5% to 5.5%. The "elongation at break" refers to a value computed using a result measured by performing a tension test specified in JIS Z 2241. Steel cord, organic fiber cord, or the like may be employed as the cord of the circumferential direction belt ply 18.

Second Inclined Belt Ply

The second inclined belt ply 20 is formed of plural cords that are arrayed parallel to each other and covered in rubber. The cords of the second inclined belt ply 20 are inclined at an angle of from 30° to 60° with respect to the tire circumferential direction. The cords of the second inclined belt ply 20 are inclined in an opposite direction to an inclination of the cords of the first inclined belt ply 16 with respect to the tire circumferential direction. An intercrossing belt layer is formed by inclining the cords of the second inclined belt ply 20 and the cords of the first inclined belt ply 16 in opposite directions to each other with respect to the tire circumferential direction, enabling the rigidity of the belt layer 22 to be raised.

Steel cords, organic fiber cords, or the like may be employed as the cords of the second inclined belt ply 20. A width W3 of the second inclined belt ply 20 is set with a width wider than that of the width W2 of the circumferential direction belt ply 18. The second inclined belt ply 20 covers the entire circumferential direction belt ply 18. The width W3 of the second inclined belt ply 20 is preferably set within a range of from 105% to 140% of the width W2 of the circumferential direction belt ply 18. (W3−W2)/2, namely, an actual dimension measured along the belt width direction from a tire width direction end of the circumferential direction belt ply 18 to a tire width direction end of the second inclined belt ply 20, is preferably 10 mm or greater.

When compared per unit width, the second inclined belt ply 20 has lower rigidity with respect to out-of-plane bending in the tire circumferential direction than the circumferential direction belt ply 18. Note that a relationship between the width W3 of the second inclined belt ply 20 and the width W1 of the first inclined belt ply 16 may be W3>W1, W3=W1, or W3<W1; however, W3≥W1 is preferable.

Ground Contact Edge Side Belt Plies

The ground contact edge side belt plies 28 are each formed of plural cords that are arrayed parallel to each other and covered in rubber. The cords of the ground contact edge side belt plies 28 are inclined at an angle that exceeds 5° and is less than 30° with respect to the tire circumferential direction. Thus, the ground contact edge side belt plies 28 have the highest rigidity with respect to out-of-plane bending in the circumferential direction and the highest burden of tensile force in the circumferential direction after those of the circumferential direction belt ply 18. The cords of the ground contact edge side belt plies 28 may be inclined in the opposite direction to, or may be inclined in the same direction as, the inclination of the cords of the second inclined belt ply 20 with respect to the tire circumferential direction. Steel cords, organic fiber cords, or the like may be employed as the cords of the ground contact edge side belt plies 28.

The ground contact edge side belt plies 28 extend from the tire width direction ends of the second inclined belt ply 20 toward the tire width direction outer sides. The ground contact edge side belt plies 28 preferably extend further toward the tire width direction outer sides than an 80% position of the ground contact width TW. The ground contact edge side belt plies 28 are preferably disposed in a region between a 60% position and a 105% position of the ground contact width TW.

As illustrated in FIG. 1, in the present exemplary embodiment, a tire width direction inside portion of each ground contact edge side belt ply 28 and the respective tire width direction outer side portion of the second inclined belt ply 20 are overlapped with each other and joined together.

When W4 is a distance dimension between a width direction outer side end of the ground contact edge side belt ply 28 on one side of the tire equatorial plane CL and a width direction outer side end of the ground contact edge side belt ply 28 on the other side of the tire equatorial plane CL, the distance dimension W4 is preferably set within a range of from 105% to 130% of the width W3 of the second inclined belt ply 20. (W4−W3)/2, namely, an actual dimension measured along the belt width direction from a tire width direction end of the second inclined belt ply 20 to a tire width direction outer side end of the respective ground contact edge side belt ply 28, is preferably 5 mm or greater.

In the present exemplary embodiment, the first inclined belt ply 16, the circumferential direction belt ply 18, the second inclined belt ply 20, and the ground contact edge side belt plies 28 are each disposed in shapes with left-right symmetry with respect to the tire equatorial plane CL.

In the pneumatic tire 10 of the present exemplary embodiment, when G1 is rigidity with respect to out-of-plane bending in the tire circumferential direction per unit width of the first inclined belt ply 16, G2 is rigidity with respect to out-of-plane bending in the tire circumferential direction per unit width of the circumferential direction belt ply 18, G3 is rigidity with respect to out-of-plane bending in the tire circumferential direction per unit width of the second inclined belt ply 20, and G4 is rigidity with respect to out-of-plane bending in the tire circumferential direction per unit width of the ground contact edge side belt plies 28, G2 is the largest. Note that G4≥G3≥G1 is preferable.

Operation and Advantageous Effects

First, explanation follows regarding a mechanism in which uneven wear occurs at shoulder sides of a tread portion. The tread portion of a pneumatic tire has curvature in the tire circumferential direction and in the tire width direction, and so the diameter of a tire width direction center portion of the tread portion is larger than the diameter at the shoulder sides of the tread portion. Thus, a circumferential length of the tire width direction center portion of the tread portion is longer than a circumferential length of the shoulder sides of the tread portion. Thus, when the pneumatic tire rolls over a road surface, shear force in the braking direction acts on the surface of the tread portion at the shoulder sides due to the difference in diameter. Moreover, shear force in the braking direction increases at locations where the nucleus of wear has occurred at an initial stage of the wear, such that the wear is liable to develop by self-induced wear.

The inventors have clarified through various test investigations that there is worse uneven wear at the shoulder sides of the tread portion in pneumatic tires as the aspect ratio decreases. It is thought that this worsening of uneven wear occurs due to the following mechanism.

First, a radial direction length (tire cross-section height) of tire side portions becomes shorter due to the aspect ratio decreasing, and the rigidity of the tire side portions is relatively higher than the rigidity of the tread portion. Thus, deformation of the tire side portions decreases, and out-of-plane deformation of the belt in the tire circumferential direction increases instead, directly below the tire rotation axis.

When the shoulder sides of the tread portion contact the road surface, and out-of-plane bending deformation of the belt in the tire circumferential direction increases, a tire radial direction outer side portion of the belt is compressed in the circumferential direction, and compression distortion in the circumferential direction increases. The tire radial direction outer side portion of the belt that was compressed in the circumferential direction then elongates at a portion of the tread portion separating from the road surface, namely, at a kick-off side of the tread portion. Accompanying this, the tread portion at the tire radial direction outer side of the belt elongates in the tire circumferential direction and the ground contact face drags against the road surface, worsening wear.

Explanation follows regarding operation of the pneumatic tire 10 of the present exemplary embodiment.

In the pneumatic tire 10 of the present exemplary embodiment, the belt layer 22 includes the circumferential direction belt ply 18 including cord set at an angle of 5° or less with respect to the tire circumferential direction, the second inclined belt ply 20 including cords set at an angle of from 30° to 60° with respect to the tire circumferential direction and inclined in the opposite direction to the inclination of the cords of the first inclined belt ply 16 with respect to the tire circumferential direction, and the ground contact edge side belt plies 28 including cords set at an angle that exceeds 5° and is less than 30° with respect to the tire circumferential direction. Thus, the rigidity of the tread portion 24 with respect to out-of-plane bending in the tire circumferential direction is raised.

The cords of the second inclined belt ply 20 and the cords of the first inclined belt ply 16 are inclined in opposite directions to each other with respect to the tire circumferential direction, and these cords intercross each other. Thus, an intercrossing belt layer is formed by the second inclined belt ply 20 and the first inclined belt ply 16, enabling rigidity with respect to in-plane shearing to be secured. This enables the difference in diameter between the tire equatorial plane CL side and the shoulder sides to be reduced, and enables uneven wear performance to be improved. Moreover, improving the rigidity of the belt layer 22 with respect to in-plane shearing enables cornering power to be improved, thereby enabling steering stability to be improved.

In the pneumatic tire 10 of the present exemplary embodiment, the ground contact edge side belt plies 28, which are configured including plural cords set with an angle that exceeds 5° and is less than 30° with respect to the tire circumferential direction and are set with relatively high rigidity with respect to out-of-plane bending, are disposed at the tire width direction outer sides of the second inclined belt ply 20. Moreover, the ground contact edge side belt plies 28 extend further toward the tire width direction outer sides than an 80% position of the ground contact width TW of the tread portion 24. This enables an advantageous effect, in which rigidity of the tread portion 24 with respect to out-of-plane bending in the tire circumferential direction is raised by the ground contact edge side belt plies 28, to be extended as far as the vicinity of ground contact edges 24E of the tread portion 24 (the vicinity of shoulders 27).

This enables compression distortion in the circumferential direction of a tire radial direction outer side portion of the belt layer 22 to be suppressed and enables dragging of the kick-off side of the tread portion 24 against the road surface to be suppressed, thereby enabling suppression of uneven wear at the shoulder sides of the tread portion 24 accompanying a decrease in the aspect ratio of the pneumatic tire 10.

Note that the second inclined belt ply 20, which is at the tire radial direction outer side of the circumferential direction belt ply 18 and is set with lower rigidity with respect to out-of-plane bending in the tire circumferential direction than the circumferential direction belt ply 18, extends further toward the tire width direction outer side than both width direction end portions of the circumferential direction belt ply 18. Moreover, the ground contact edge side belt plies 28, which are similarly set with lower rigidity with respect to out-of-plane bending in the tire circumferential direction than the circumferential direction belt ply 18, are disposed at the tire width direction outer sides of the second inclined belt ply 20. Thus, rigidity gradually changes from tire width direction outer ends of the circumferential direction belt ply 18 toward the ground contact edges 24E, and a reduction in uneven wear performance accompanying a sudden change in rigidity is suppressed. Note that when the respective tire width direction outer sides end portions of the circumferential direction belt ply 18, the second inclined belt ply 20, and the ground contact edge side belt plies 28 are too close to each other, this results in a large step in the rigidity along the tire width direction, giving rise to a concern of a malfunction occurring, such as separation starting at width direction ends of the belt plies, and a concern of a reduction in durability at belt end portions.

The second inclined belt ply 20 is disposed at the tire radial direction outer side of the circumferential direction belt ply 18, thereby enabling damage to the cords of the circumferential direction belt ply 18 due to input from the road surface, or due to foreign matter and so on piercing through the tread portion 24, to be suppressed, enabling the durability of the circumferential direction belt ply 18 to be improved.

In the pneumatic tire 10 of the present exemplary embodiment, the first inclined belt ply 16, which has a width wider than that of the circumferential direction belt ply 18 and is configured including plural cords set at an angle of from 45° to 60° with respect to the tire circumferential direction, is disposed between the circumferential direction belt ply 18 and the carcass 14. This enables the ability of the tread portion 24 to envelop protruding objects to be improved, and enables plunger durability of the pneumatic tire 10 to be secured.

Note that, when the width W1 of the first inclined belt ply 16 is less than 70% of the ground contact width TW of the tread portion 24, plunger durability cannot be secured at the shoulder sides of the tread portion 24. Moreover, the inter-crossing width of the first inclined belt ply 16 with the second inclined belt ply 20 is smaller, and rigidity with respect to in-plane shearing cannot be secured.

However, when the width W1 of the first inclined belt ply 16 exceeds 95% of the ground contact width TW of the tread portion 24, the end portions of the ground contact edge side belt plies 28 are too close, and belt durability is reduced.

When the angle of the cords of the first inclined belt ply 16 is less than 45° with respect to the tire circumferential direction, the rigidity of the first inclined belt ply 16 in the tire circumferential direction is raised, the ability to envelop protruding objects is reduced, and there is a concern that plunger durability cannot be secured.

However, when the angle of the cords of the first inclined belt ply 16 with respect to the tire circumferential direction exceeds 60°, the rigidity with respect to in-plane shearing is lowered, leading to a negative effect on uneven wear performance of the tread end portions, and a reduction in steering stability.

When the width W2 of the circumferential direction belt ply 18 is less than 50% of the ground contact width TW, maintainability is reduced, there is an increase in internal pressure and increase in length when running, leading to an increase in groove cracks and a reduction in belt durability. When the width W2 of the circumferential direction belt ply 18 exceeds 85% of the ground contact width TW, the width direction end portions of the circumferential direction belt ply 18 are too close to the ground contact edges 24E of the tread portion 24, and there is a strong concern that the width direction end portions of the circumferential direction belt ply 18 and the width direction end portions of the second inclined belt ply 20 are aligned with each other, as well as a strong concern that the width direction end portions of the circumferential direction belt ply 18 and the width direction outer side end portions of the ground contact edge side belt plies 28 are aligned with each other, such that the step in rigidity in the width direction increases. Thus, separation starting at the width direction end portions of the circumferential direction belt ply 18, the width direction end portions of the second inclined belt ply 20, and the width direction outer side end portions of the ground contact edge side belt plies 28, as well as other malfunctions, are more liable to occur.

When the width W2 of the circumferential direction belt ply 18 is less than 60% of the width W1 of the first inclined belt ply 16, the width W2 of the circumferential direction belt ply 18 is too narrow, the internal pressure maintainability is reduced, there is an increase in internal pressure and increase in length when running, leading to an increase in groove cracks, and a reduction in belt durability.

However, when the width W2 of the circumferential direction belt ply 18 exceeds 95% of the width W1 of the first inclined belt ply 16, the end portions of the circumferential direction belt ply 18 and the end portions of the first inclined belt ply 16 are too close to each other, and there is a reduction in belt durability.

When the angle of the circumferential direction belt ply 18 with respect to the tire circumferential direction exceeds 5°, the internal pressure maintainability is reduced, there is an increase in internal pressure and increase in length when running, leading to an increase in groove cracks and a reduction in belt durability.

When the angle of the cords of the second inclined belt ply 20 is 30° or less with respect to the tire circumferential direction, the rigidity with respect to in-plane shearing is lowered, leading to a negative effect on uneven wear performance of the tread end portions and a reduction in steering stability.

When the width W3 of the second inclined belt ply 20 is less than 105% of the width W2 of the circumferential direction belt ply 18, the end portions of the circumferential direction belt ply 18 and the end portions of the first inclined belt ply 16 are too close to each other, such that there is a reduction in belt durability, the intercrossing width with the second inclined belt ply 20 is smaller, and rigidity with respect to in-plane shearing cannot be secured.

However, when the width W3 of the second inclined belt ply 20 exceeds 140% of the width W2 of the circumferential direction belt ply 18, the width W3 of the second inclined belt ply 20 is too wide, such that the end portions of the ground contact edge side belt plies 28 are too close and there is a reduction in belt durability as a result.

When the width W3 of the second inclined belt ply 20 exceeds 95% of the ground contact width TW of the tread portion 24, the width W3 of the second inclined belt ply 20 is too wide, such that the end portions of the ground contact edge side belt plies 28 are too close and there is a reduction in belt durability as a result.

When the angle of the cords of the second inclined belt ply 20 is less than 30° with respect to the tire circumferential direction, the rigidity with respect to in-plane shearing is lowered, leading to a negative effect on uneven wear performance of the tread end portions and a reduction in steering stability.

However, when the angle of the cords of the second inclined belt ply 20 with respect to the tire circumferential direction exceeds 60°, there is insufficient rigidity of the second inclined belt ply 20 with respect to out-of-plane bending in the tire circumferential direction.

When the distance dimension W4 of the ground contact edge side belt plies 28 is less than 105% of the width W3 of the second inclined belt ply 20, rigidity with respect to out-of-plane bending cannot be secured as far as the ground contact edges, and there is a negative effect on uneven wear performance.

However, in practice, an upper limit of the distance dimension W4 of the ground contact edge side belt plies 28 is 130% of the width W3 of the second inclined belt ply 20.

When the distance dimension W4 of the ground contact edge side belt plies 28 is less than 80% of the ground contact width TW, the advantageous effect, in which rigidity with respect to out-of-plane bending in the tire circumferential direction is raised by the ground contact edge side belt plies 28, cannot be extended as far as the vicinity of the ground contact edges 24E of the tread portion 24.

Note that when the ground contact edge side belt plies 28 extend further toward the tire width direction inside (tire equatorial plane CL side) than a 60% position of the ground contact width TW, rigidity with respect to out-of-plane bending cannot be secured as far as the ground contact edges, and there is a negative effect on uneven wear performance.

The ground contact edge side belt plies 28 may extend further toward the tire width direction outer sides than a 105% position of the ground contact width TW, but extend as far as a 105% position of the ground contact width TW in practice.

When an angle of the cords of the ground contact edge side belt plies 28 is 30° or greater with respect to the tire circumferential direction, rigidity of the ground contact edge side belt plies 28 with respect to out-of-plane bending in the tire circumferential direction is insufficient, and the advantageous effect, of improving rigidity with respect to out-of-plane bending in the tire circumferential direction in the vicinity of the ground contact edges 24E by using the second inclined belt ply 20, cannot be attained.

Second Exemplary Embodiment

Explanation follows regarding a pneumatic tire 10 according to a second exemplary embodiment of the present invention.

The ground contact edge side belt plies 28 of the pneumatic tire 10 of the first exemplary embodiment are what are referred to as inclined belt plies including plural cords set an angle that exceeds 5° and is less than 30° with respect to the tire circumferential direction. However, the ground contact edge side belt plies 28 of the present exemplary embodiment are what are referred to as circumferential direction belt plies (spiral belt plies), each configured including one or plural rubber-covered cords wound in a spiral shape. An angle of the cords is set at 5° or less with respect to the tire circumferential direction. Steel cords, organic fiber cords, or the like may be employed as the cords. As examples, nylon cords or aromatic polyamide cords may be applied as organic fiber cords.

In cases in which the ground contact edge side belt plies 28 are circumferential direction belt plies as in the present exemplary embodiment, the ground contact edge side belt plies 28 and the second inclined belt ply 20 are preferably overlapped with each other and connected together.

The pneumatic tire 10 according to the second exemplary embodiment configured in this manner enables rigidity with respect to out-of-plane bending in the tire circumferential direction to be raised and enables the advantageous effect of suppressing uneven wear to be increased in the vicinity of the ground contact edges of the belt layer 22, compared to the first exemplary embodiment.

Other Exemplary Embodiments

Exemplary embodiments of the present invention have been explained above; however, the present invention is not limited to the above description, and obviously various other modifications may be implemented within a range not departing from the spirit of the present invention.

The pitch of the cords of the circumferential direction belt ply 18 may be constant along the tire width direction, or may be changed along the tire width direction. For example, a configuration may be applied in which the pitch at both width direction sides of the cords of the circumferential direction belt ply 18 is set narrower than the pitch at the width direction center side thereof, so as to raise rigidity with respect to out-of-plane bending in the tire circumferential direction at both width direction sides. This enables rigidity with respect to out-of-plane bending in the tire circumferential direction at the shoulder sides of the belt layer 22 to be raised and also enables the advantageous effect of suppressing uneven wear at the shoulder sides to be improved.

Note that it is sufficient as long as a gap in the tire width direction is opened between the second inclined belt ply 20 and the ground contact edge side belt plies 28, and width direction outer side ends of the second inclined belt ply 20 and respective tire width direction inside ends of the ground contact edge side belt plies 28 may be abutted and connected together as long as there are no issues, such as a reduction in rigidity causing a malfunction to occur.

Test Example

Figure 2:
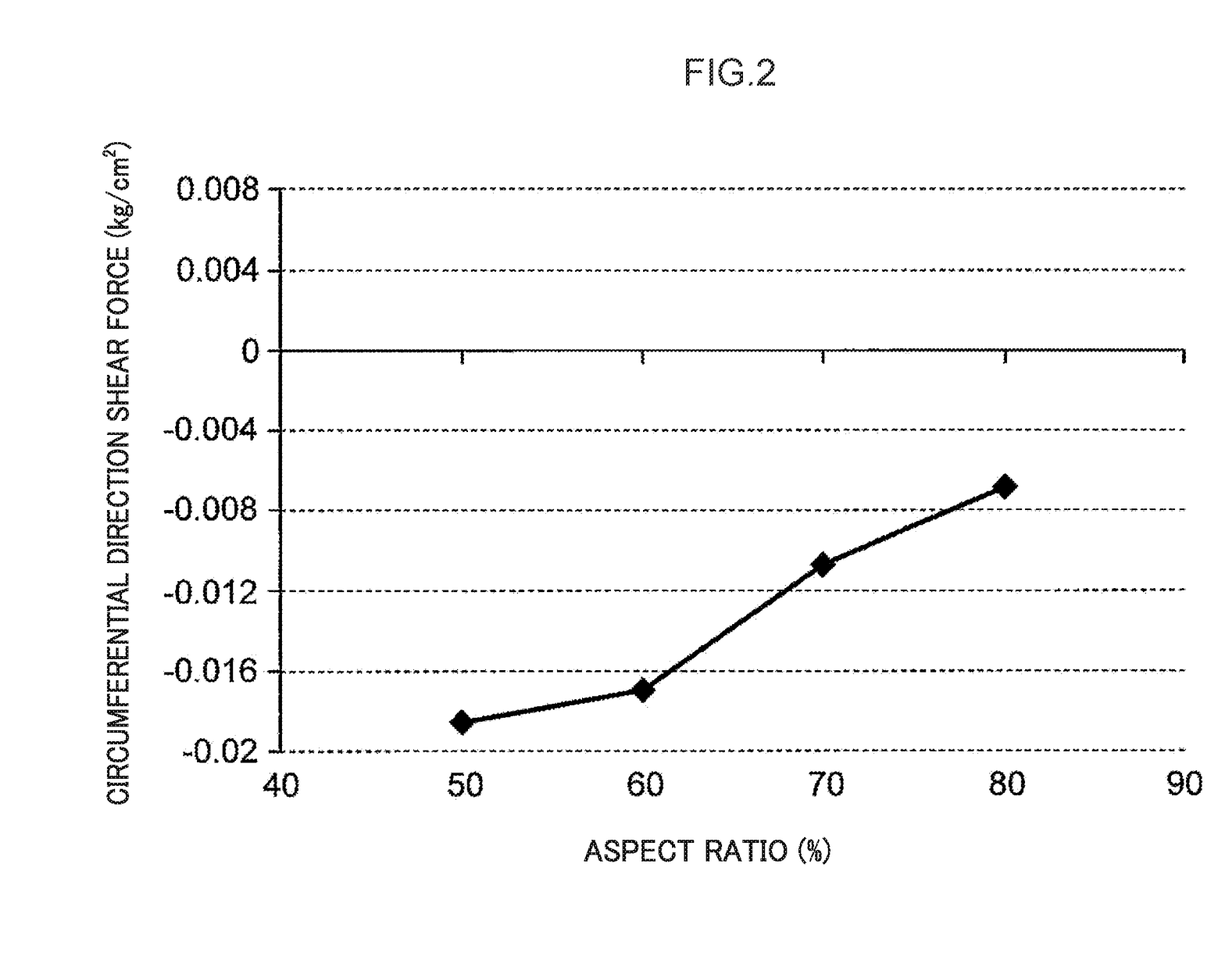
FIG. 2 is a graph illustrating a relationship between an aspect ratio and shear distortion.

The graph in FIG. 2 illustrates a relationship between aspect ratio and circumferential direction shear force in the vicinity of shoulders of a tread portion. It is apparent that the lower the aspect ratio, the larger the circumferential direction shear force in the braking direction (the direction in which rotation slows).

Test Method: Measured employing a tire tread face ground contact portion measuring device described in JP-A No. H07-63658.

When the circumferential direction shear force increases in the braking direction, drag of the tread portion against the road surface increases and there is worse uneven wear. Thus, it is apparent from graph showing the test results that the lower the aspect ratio of the pneumatic tire, for example, as the aspect ratio decreases below 65%, the greater the advantageous effect that can be obtained by suppressing uneven wear at the shoulder sides of the tread portion.

The invention claimed is:

1. A pneumatic tire comprising:
   a carcass that spans from one bead portion to another bead portion;
   a tread portion that is disposed at a tire radial direction outer side of the carcass and that contacts a road surface; and
   a belt layer that includes
      a first inclined belt ply that is disposed inside the tread portion at the tire radial direction outer side of the carcass and that includes a plurality of cords set at an angle of from 45° to 60° with respect to a tire circumferential direction,
      a circumferential direction belt ply that is disposed at the tire radial direction outer side of the first inclined belt ply, that includes a cord wound in a spiral shape and set at an angle of 5° or less with respect to the tire circumferential direction, and that is formed with a narrower width than the first inclined belt ply,
      a second inclined belt ply that is disposed at the tire radial direction outer side of the circumferential direction belt ply, that is inclined in an opposite direction to an inclination of the cords of the first inclined belt ply with respect to the tire circumferential direction, that includes a plurality of cords set at an angle of from 30° to 60° with respect to the tire circumferential direction, and that is set with a width wider than that of the circumferential direction belt ply, and
      a pair of ground contact edge side belt plies: (1) that extend from at least both tire width direction end portions of the second inclined belt ply toward tire width direction outer sides, (2) that extend further toward the tire width direction outer sides than an 80% position of a ground contact width of the tread portion, (3) that include a plurality of cords set at an angle that exceeds 5° and is less than 30° with respect to the tire circumferential direction, (4) that are overlapped with each portion, of the second inclined belt ply, which is wider than the circumferential direction belt ply, (5) that are disposed apart from the circumferential direction belt ply in a tire width direction, and (6) that have outer end portions in the tire width direction that are disposed farther in a tire radial direction outer side than outer end portions of the first inclined belt ply in the tire width direction, wherein the first inclined belt ply, the circumferential direction belt ply, the second inclined belt ply, and the ground contact edge side belt plies are disposed in this sequence from the tire radial direction inside, and a distance dimension between a width direction outer side end of the ground contact edge side belt ply on one side of the tire equatorial plane and a width direction outer side end of the ground contact edge side belt ply on the other side of the tire equatorial plane is set within a range of from 105% to 130% of the width of the second inclined belt ply.

2. The pneumatic tire of claim 1, wherein the cords of the first inclined belt ply and the cords of the second inclined belt ply are inclined in opposite directions to each other with respect to the tire circumferential direction.

3. The pneumatic tire of claim 1, wherein the cord of the circumferential direction belt ply is an extendable cord that has elongation properties of from 4.5% to 5.5% elongation at break.

4. The pneumatic tire of claim 1, wherein:
   a part of each of the ground contact edge side belt plies contacts the second inclined belt ply; and
   the ground contact edge side belt plies are disposed in a region of from 60% to 105% of the ground contact width.

5. The pneumatic tire of claim 1, wherein an aspect ratio is 65% or lower.

* * * * *